United States Patent [19]

Roberts

[11] Patent Number: 4,517,798
[45] Date of Patent: May 21, 1985

[54] POROUS CATALYTIC METAL PLATE DEGENERATION BED IN A GAS GENERATOR

[75] Inventor: Thomas G. Roberts, Huntsville, Ala.

[73] Assignee: The United States of America as represented by the Secretary of the Army, Washington, D.C.

[21] Appl. No.: 499,581

[22] Filed: May 31, 1983

[51] Int. Cl.³ .................. F02K 9/42; F02K 9/95
[52] U.S. Cl. .................. 60/39.462; 60/218; 60/723; 502/321
[58] Field of Search .......... 60/200 R, 200 A, 218, 60/39.462, 723; 252/477 R; 502/321

[56] References Cited

U.S. PATENT DOCUMENTS

| | | | |
|---|---|---|---|
| 2,698,514 | 1/1955 | Hull et al. | 60/39.462 |
| 3,464,223 | 8/1969 | Roberts et al. | 62/55.5 |
| 3,503,212 | 3/1970 | Jennings et al. | 60/218 |
| 3,608,313 | 9/1971 | Guth et al. | 60/219 |
| 3,627,790 | 12/1971 | Stiles | 260/369 |
| 3,667,231 | 6/1972 | Hubbuch et al. | 60/218 |
| 3,673,801 | 7/1972 | Goldberger | 60/218 |
| 3,710,573 | 1/1973 | Hubbuch et al. | 60/218 |
| 3,711,427 | 1/1973 | Murfree, Jr. et al. | 252/455 |
| 3,755,205 | 8/1973 | Duncan et al. | 252/458 |
| 3,757,520 | 9/1973 | Murfree, Jr. et al. | 60/219 |
| 4,086,264 | 4/1978 | Brooks et al. | 252/454 |
| 4,197,700 | 4/1980 | Jahnig | 60/723 |
| 4,211,072 | 7/1980 | Twardy et al. | 60/39.462 |
| 4,288,982 | 9/1981 | Kuenzly | 60/39.462 |

*Primary Examiner*—Edward A. Miller
*Attorney, Agent, or Firm*—Anthony T. Lane; Robert P. Gibson; Jack W. Voigt

[57] ABSTRACT

A gas generator for passing pressurized liquid monopropellants therethrough for causing exothermic decomposition of the monopropellants. A porous catalytic metal plate is used as the degeneration bed. The monopropellant decomposes exothermically upon contact with the catalytic plate. The porosity is obtained by making the plate from an alloy of the catalyst metal and one other metal, the other metal is then etched away by an acid that does not attack the catalyst metal. The porosity is controlled by the amount of other metal used. Surface areas of several hundred times the original plate surface area are obtainable. The mechanical characteristics of the metal plate allow for greater design flexibility than was available with decomposition beds made of refractory material.

2 Claims, 1 Drawing Figure

POROUS CATALYTIC METAL PLATE DEGENERATION BED IN A GAS GENERATOR

DEDICATORY CLAUSE

The invention described herein may be manufactured, used, and licensed by or for the Government for governmental purposes without the payment to me of any royalties thereon.

BACKGROUND OF THE INVENTION

Reliable, useful monopropellant liquid gas generators for use in missiles are a necessity and much work has been done on the catalytic decomposition of hydrazine and similar fuels for this purpose. Liquid gas generators have used inert beds with a catalyst such as shell 405 catalyst and inert beds with various oxidizing agents such as $I_2O_5$, $HIO_3$, and $KM_nO_4$. In this type of gas generation, the catalytic beds are very expensive, and the inert beds with oxidizing agents can only be started a limited number of times. Some of these systems are also very expensive due to the chemical used therein.

Inert porous support materials such as firebrick and other refractory materials can be used with oxidizing agents and restarts can be made because the material is heated sufficiently to not only maintain decomposition of a liquid monopropellant by a hypergolic or spontaneous exothermic reaction, but this heat can be maintained for a time to allow for restarts. However, hot spots are formed and both the starts and restarts are not uniform initially. Also, the material used is large and crumbles easily, which makes construction options limited and necessarily large, but these materials are inexpensive.

These same materials can be used to make a true catalytic bed for a gas generator by saturating them with a molybdenum resinate and a turpentine solution and decomposing the solution to leave a residue coating on the inert porous material. A manganese carbonyl compound or other substances could be used in place of the molybdenum. But, the construction options are still limited and the generators are large.

The present invention provides a gas generator having a porous catalytic plate as the degeneration bed. The physical properties of the metal plate allow for greater design flexibility.

SUMMARY OF THE INVENTION

A gas generator having a porous catalytic metal plate as the decomposition bed. The catalytic plate is prepared by etching one metal out of an alloy plate. The alloy plate is formed with the catalyst and another metal, such as the catalyst molybdenum and aluminum. After etching away the aluminum, a porous molybdenum plate remains as the catalytic bed. Etching provides the porosity necessary to allow passage of the liquid monopropellant and decomposition gases while providing the large catalytic surface area needed for efficient decomposition. Porosity is controlled by the composition of the alloy.

DESCRIPTION OF THE PREFERRED EMBODIMENT

Figure 1:
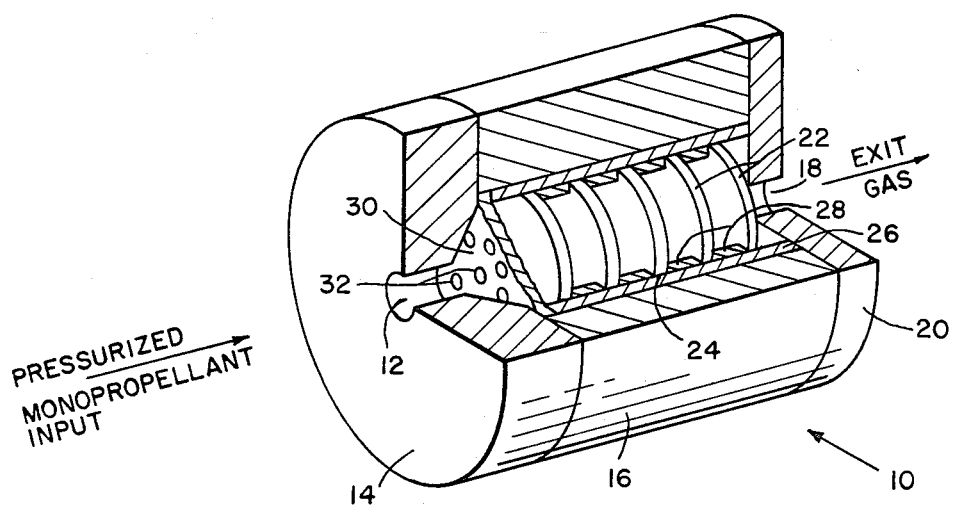
FIG. 1 is a perspective view, shown partially cutaway of a gas generating bed of this invention inside a gas generator.

FIG. 1 shows a gas generator 10 having an inlet 12 in an end 14; a body 16 and an outlet 18 in a second end 20. A plurality of porous catalytic plates 22 are secured by refractory adhesive 24 in a sleeve 26 in spaced relation, in said body between the inlet and the outlet. A plurality of spacers 28 are placed between the plates to maintain the desired distance between them. An injector plate 30 is secured in the body adjacent to inlet 12 and is provided with a plurality of aperatures 32 to allow injection of monopropellant from a pressurized injector (not shown) through the apertures into the porous catalytic plates.

The porous catalytic plates are made by forming an alloy plate consisting of the desired catalyst and one other metal. That other metal is then etched out of the plate. For example, molybdenum plates are made by etching the aluminum out of plates made of aluminum-molybdenum alloy. An alloy with between 20 to 50 percent aluminum is satisfactory. The porosity is controlled by the amount of aluminum used in making the alloy. Surface areas of several hundred times the original plate surface area are readily obtainable. The particular surface area obtainable depends on the percentage of catalyst material in the alloy. Obviously, the higher the percentage of catalyst, the greater the plate strength, and the lesser the surface area. The mechanical characteristics of the metal plate allow for greater design flexibility than was available with decomposition beds made of refractory material. These plates are first constructed or machined to the desired size and shape before the etching is done. For plates formed from a mixture of molybdenum and aluminum as in this example, the etching is accomplished by boiling in a dilute solution of from 10 to 12 molar sodium hydroxide solution (NaOH). Other materials, such as manganese compounds could also be mixed with aluminum and etched to form other porous catalytic beds. An additional method, for making porous plates which may be used as a catalytic plate degeneration bed in a gas generator, consist of mixing any metal below hydrogen in the Electromotive Series with any metal above hydrogen in the Electromotive Series and using an acid to etch away the metal above hydrogen in the Electromotive Series. An example of this method is to etch the zinc out of brass to leave a porous copper plate. In this case a boiling solution (104.0° C.) of one part by volume of C. P. Reagent hydrochloric acid mixed with three parts by volume of distilled water is used. Termination of the etching process is indicated by the cessation of hydrogen formation on the surface of the plates. These plates, which are now porous, are boiled in distilled water for approximately two hours merely to clean them, and then warm-air dried at a convenient temperature such as at about 200° C. before being used in the gas generator. Other catalytic plates which may be made by this technique include silver, platinum, gold and other materials below hydrogen in the Electromotive Series.

Although a particular embodiment and form of this invention has been illustrated, it is apparent that various modifications and embodiments of the invention may be made by those skilled in the art without departing from the scope and spirit of the foregoing disclosure. For example the porous plates could be made from non-catalytic metals. These non-catalytic porous metal plates could be heated by reacting the monopropellant with an initiator and when the initiator is consumed, the decomposition is maintained thermally. Accordingly, it is understood that the invention is limited only by the claims appended hereto.

I claim:

1. A gas generator comprising: chamber means having an input port for receiving fluid monopropellant and an output port for providing for gaseous output; and, a plurality of porous catalytic metal plates disposed within said chamber in parallel spaced relation and normal to the axis of said input and output ports, said catalytic metal plates being formed of only a self-supporting catalyst, said catalyst being selected to cause exothermic decomposition of 2. A gas generator as set forth in claim 1 wherein said catalyst is molybdenum.

* * * * *